Jan. 25, 1966  D. A. NEWMAN ET AL  3,230,874
COPY MEANS
Filed Sept. 22, 1960  3 Sheets-Sheet 1

INVENTOR.
Douglas A. Newman
BY Angelo Vaccaro

Johnson and Kline
ATTORNEYS

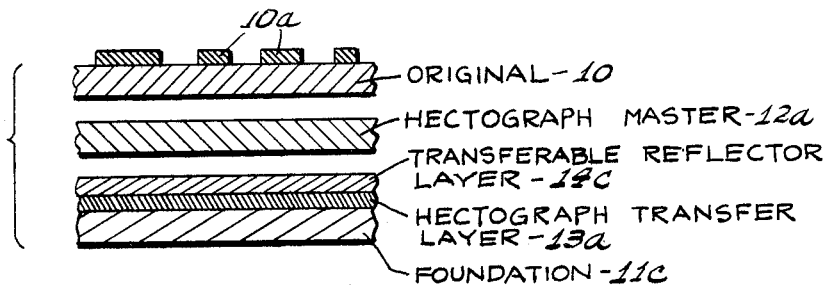
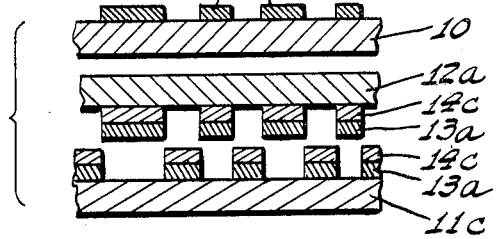
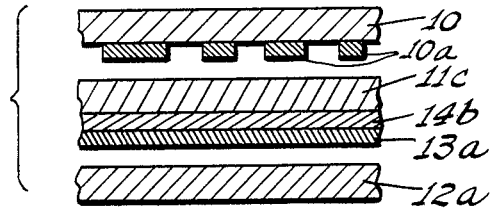
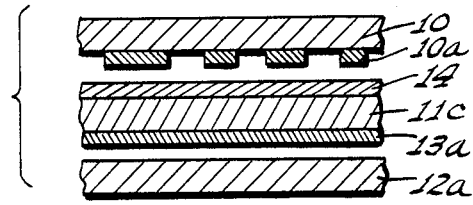
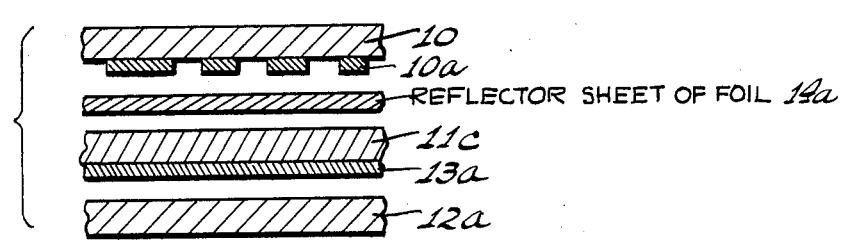

United States Patent Office 3,230,874
Patented Jan. 25, 1966

3,230,874
COPY MEANS
Douglas A. Newman, Glen Cove, and Angelo Vaccaro, Port Washington, N.Y., assignors to Columbia Ribbon and Carbon Manufacturing Co., Inc.
Filed Sept. 22, 1960, Ser. No. 57,794
16 Claims. (Cl. 101—149.4)

The present invention is concerned with master and copy sheets prepared by thermographic means and with the novel transfer media for effecting the same.

It is known to prepare hectograph master sheets by thermographic processes. These known processes employ the principle that certain dyes and pigments absorb large amounts of infrared radiation and thus convert it to heat while other dyes and pigments are substantially immune to such infrared radiation and allow it to pass through without any substantial heat generation.

Thus it is known to prepare a hectograph master sheet by superposing an original sheet, imaged on its upper surface with an infrared-absorbing pigment, a master sheet and a hectograph transfer sheet, the transfer layer of which bears dyes which do not absorb infrared radiation. The radiation is directed upon the original sheet, absorbed by the images thereon and converted to heat. This heat then passes through the original sheet and through the master sheet to the hectograph layer which it melts in areas corresponding to the heat-generating images of the original. The master sheet which is in contact with the dye layer is thus provided in the preselected areas with a mirror-reverse duplicate of the original and is used in the spirit process to produce hectograph copies. The limitation of known processes is that they require the use of special noninfrared radiation-absorbing pigments and dyestuffs in the transfer layer of the transfer sheets.

It is an object of the present invention to provide a method of using infrared radiation-absorbing pigments and dyestuffs to produce thermographically reproducible copies by thermographic means.

It is another object of the present invention to provide true carbon copies of an original under the influence of infrared radiation.

It is a further object of the present invention to prepare hectograph master sheets imaged with infrared radiation-absorbing dyestuffs.

It is still a further object to prepare thermographically reproducible planographic master sheets using thermographic means.

These and other objects are accomplished according to the present invention as set forth herein.

In the drawings:

FIGURE 1 is a fragmentary cross-section, to an enlarged scale, of an imaged original sheet 10, a transfer sheet 11 and a copy sheet 12 superposed in intimate contact prior to being subjected to infrared radiation.

FIGS. 6 and 8 to 12 are fragmentary cross-sections, to an enlarged scale, of an imaged original sheet, a reflector material, a hectograph transfer sheet and a master sheet, separated for purposes of illustration and superposed prior to treatment with infrared radiation.

FIG. 7 illustrates the sheets of FIG. 6 after the treatment with infrared radiation showing the imaged master sheet and the used hectograph transfer sheet.

The present invention is based upon the discovery that transfer layers which contain infrared-absorbing pigments or dyestuffs may be employed in the thermographic processes of producing copy so long as these layers are protected against the penetration of this radiation. It has been found that if there is present between the images on the original sheet and the transfer layer material which will reflect or bounce back the infrared rays, but will conduct the absorbed heat generated by the images of the original sheet to the transfer layer, sharp and clear copies will be produced on the copy sheet corresponding to the imaged areas of the original. This result may be accomplished in different ways depending on the result desired. That is to say, the reflector media may be carried by different components in the pile and may be placed in various positions in the superposed pile of sheets. In fact, as will be pointed out below, the reflector may be a discrete sheet interposed in various positions in the pile, or a coating on one of the sheets or may be incorporated in one of the sheets.

Figure 1:
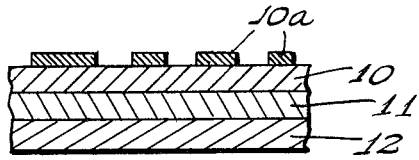

FIG. 1 illustrates the manner in which the original sheet 10, the transfer sheet 11 and the copy-receiving sheet 12 may be superposed in contact with each other preparatory to and during the application of radiation to make a copy.

In FIGS. 2 to 12 the several sheets of the pile are shown spaced from each other for illustrative purposes.

Figure 2:
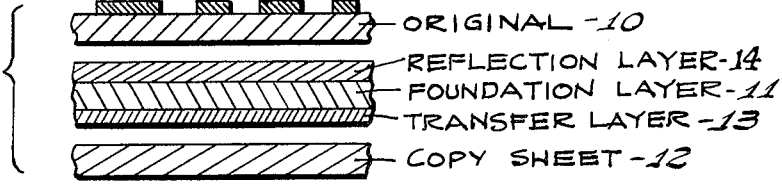
FIGS. 2 to 5 are fragmentary cross-sections, to an enlarged scale, of an imaged original sheet, a reflector material, a carbon transfer sheet and a copy sheet, separated for purposes of illustration and superposed prior to treatment with infrared radiation.

In FIG. 2, which illustrates one form of this invention, a transfer sheet has a foundation 11 carrying a suitable transfer layer 13 which may comprise a conventional wax base carbon material in which case a carbon copy of the original will be produced.

The sheet 11 may comprise any conventional foundation sheet such as paper or a plastic film, generally used for a transfer sheet and the same is true with regard to the copy sheet 12.

As shown in FIG. 2, the reflector medium 14 is composed of an adhered layer of infrared radiation-reflecting material such as metallic particles, sprayed or vacuum-deposited thereon, or it may be a coating heavily pigmented with white pigments such as titanium dioxide, zinc oxide, zinc sulfide or metallic pigments such as finely divided or powdered silver, aluminum, bronze, tin or the like.

Figure 5:
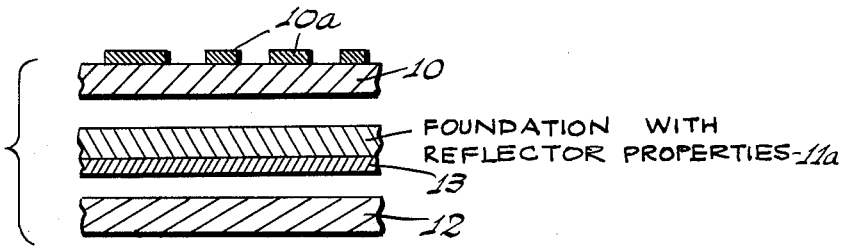

If desired, the paper or plastic of foundation sheet 11 may itself constitute the reflector. Thus, as shown in FIG. 5, the transfer sheet 11a may be a sheet having incorporated in it infrared radiation-reflecting material or it may be a metal foil. In either case the transfer coating 13 would be carried on one surface of the sheet which faces the copy sheet. The reflector medium may be constituted by a separate and discrete sheet, such as the sheet 14a shown in FIG. 3 and which, when it is desired to make a carbon copy thermographically, is interposed between the imaged original sheet 10 and the transfer sheet, thus permitting ordinary or any desired carbon sheets such as the sheet 11b to be used. The sheet 14a may be a metal foil or it may have a reflection coating or may be a plastic film containing within it infrared radiation-reflecting material.

Figure 4:
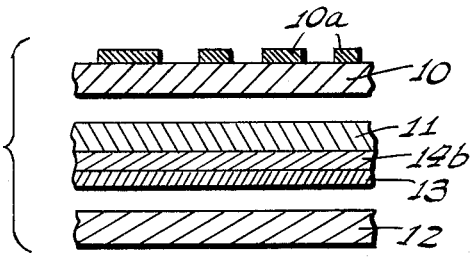

As stated hereinbefore, the reflection material may be placed at various positions in the pile of superposed sheets. For instance, instead of being positioned on the surface of the transfer sheet opposite the transfer layer, as shown by FIG. 2, the reflection material 14b may be positioned between the transfer sheet foundation 11 and the transfer layer 13 as illustrated by FIG. 4. The reflector material may be constituted of a metallic or white coating having radiation-reflecting properties. Thus the heat-conducting reflector being in intimate contact with the transfer material would be more effective in softening the transfer material over the imaged areas and permit a harder, more smudge-resistant carbon coating to be used.

In the forms of the invention shown in FIGS. 2 to 5, the order of the sheets is suitable for making carbon copies of originals with ordinary or any suitable infrared radiation-absorbing transfer material. These forms may also be advantageously used in the production of planographic master sheets from an original. In such case the copy sheet will constitute the suitable master sheet and planographic pigments such as nigrosine and Bismarck brown may be used in the transfer layer.

In still another form of the present invention, spirit hectograph master sheets may be produced thermographically directly from an original sheet. As is well-known in the art, spirit hectograph master sheets are imaged in reverse so that the duplicate copies produced in the spirit process are direct-reading. Therefore in the preparation of such hectograph master sheets according to the present process, a variation of the order of the sheets shown in FIGS. 2 to 5 must be made, as well as other variations as hereinafter set forth.

FIG. 6 shows one method of superposing the original 10, the copy sheet which is the potential spirit master sheet 12a, and the hectograph transfer sheet 11c. Since sheet 12a is to be used, after reverse-imaging, as a master in the spirit process, then it is preferably a film or sheet having good wet strength. The transfer sheet 11c is composed of a suitable foundation having on the surface thereof a suitable transfer layer 13a containing hectograph dyestuff. This layer is then supercoated with a reflection layer 14c which is frangible and transferable to the master sheet together with the dyestuff layer 13a according to the present process as demonstrated by FIG. 7. The reflection layer in this instance may be composed of a suitable heat-meltable binder material such as wax containing the reflection material such as metallic particles or white pigments such as zinc oxide, titanium dioxide, zinc sulfide or the like.

However, it is not necessary that the reflection layer be frangible in order to produce hectograph master sheets by the present invention, and FIGS. 8 to 12 illustrate the use of nonfrangible reflector layers, sheets and foils for this purpose.

FIGS. 8 and 9, for instance, show an aspect of the present invention in which the reflection material is a part of the hectograph transfer sheet and comprises a coating 14 containing reflecting material. In FIG. 8 the material 14b is present between the foundation 11c and the hectograph transfer layer 13a. In FIG. 9 the material 14 is present on the upper surface of the foundation while the transfer layer is carried by the opposite or undersurface of the foundation.

Figure 11:
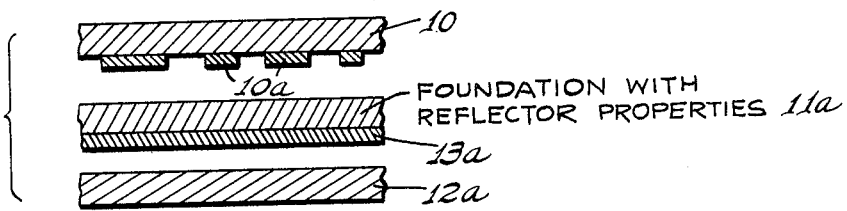
Figure 12:
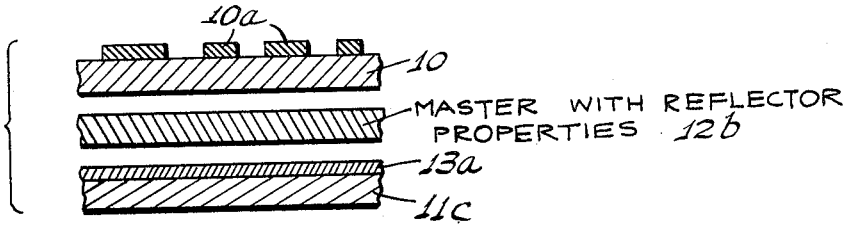

FIGS. 10, 11 and 12 demonstrate still another aspect of preparing hectograph master sheets in which the reflecting material is present as a self-supporting sheet or metal foil. In FIG. 10, for instance, the reflecting sheet or foil 14a is a separate and distinct sheet or metal foil which is interposed between the original sheet 10 and the hectograph transfer sheet 13a, thus permitting the use of conventional infrared radiation-absorbing hectograph transfer sheets in imaging the master sheet 12a thermographically.

In FIG. 11, the reflector material is present as a self-supporting white plastic sheet or metal foil which serves as the foundation 11a for the hectograph transfer layer 13a, whereas in FIG. 12 the reflection material is present as a self-supporting white plastic sheet or metal foil 12b which becomes imaged and serves as the final spirit hectograph master sheet. This latter embodiment is advantageous in that the heat-conducting reflector material is in surface contact with the transfer layer and facilitates the transfer process, and also allows for the use of conventional hectograph transfer sheets.

As illustrated by FIGS. 8 to 11, the original sheet 10 is inverted so that the images thereon are facing and against the sheet beneath, thereby allowing for the production of reverse-images on the master sheet in the present process, master sheets produced in this manner being suitable for the production of duplicate copies in the spirit hectograph process.

It should be understood that when hectograph master sheets are to be prepared for the gelatin hectograph process, then such masters should be direct-imaged. This may be accomplished according to the present invention by merely inverting the original sheet of FIGS. 6 and 12 so that the images are on the underside of the original and against the underlying sheet, or by inverting the original sheet of FIGS. 8 to 11 so that the images are on the top side and facing the radiation source. In this manner the master sheet will be direct-imaged according to the present process.

Figure 13:
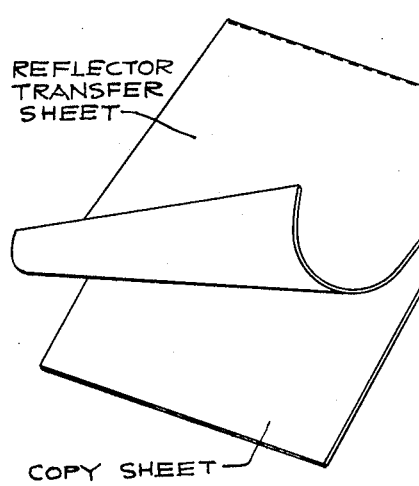
FIG. 13 is a schematic illustration of a folder comprising a transfer sheet and a copy-receiving sheet, flexibly and removably attached at one end.

FIG. 13 exemplifies a handy composite of a reflector transfer sheet, which may comprise any of the alternative reflector transfer sheets heretofore disclosed, and a copy sheet which may be ordinary paper, tissue paper or any suitable copy sheet or master paper. Of course the transfer layer is in contact with the copy sheet during use. The sheets are removably attached at one end with severance lines 45 provided for removing the copy sheet once it is imaged.

Figure 14:
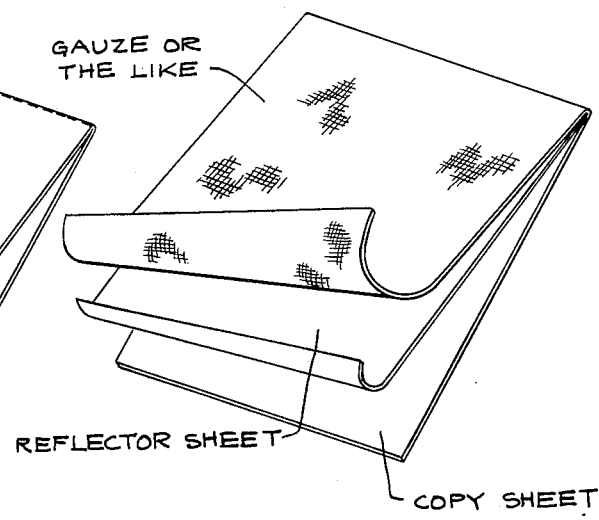
FIG. 14 is a schematic illustration of a folder comprising a noninfrared-absorbing top sheet, a reflector sheet and a copy-receiving sheet.

FIG. 14 exemplifies a handy insert folder which facilitates the preparation of copies or master sheets according to the present invention. The folder comprises a top sheet which may be gauze material, tissue paper or a clear plastic film; a reflector sheet which may be a metal foil of aluminum, tin or the like, or metallized or white-pigmented plastic such as gold, silver, aluminum, titanium dioxide, zinc oxide, etc., metallized or pigmented Mylar, Teslar, Teflon, nylon, Saran or cellulose acetate; and a base sheet of flexible material such as paper or plastic film.

In accordance with the present invention, duplicate copies, hectograph master sheets and planographic master sheets may be produced automatically directly from an original sheet 10 which bears images 10a of infrared radiation-absorbing material which generates heat upon absorbing such radiation. In general it has been found that black images of nigrosine, carbon black or the like give the best results. The present invention has made it possible to automatically produce copies from transfer sheets carrying any type of pigment or dye having infrared radiation-absorbing qualities. For instance, it is now made possible to produce reproducible carbon copies exactly corresponding to an original sheet with carbon paper in a Thermo-Fax machine. The copies so made may be reproduced themselves using chemically reactive Thermo-Fax paper or other thermographic duplicating paper, or by repeating the present transfer cycle using them as originals. It is also made possible to produce sharper and clearer hectograph master sheets from all types of dyestuffs than heretofore possible by known thermographic processes.

The following procedures are set forth to exemplify but not limit the production of copy of the various types discussed above.

To produce single copies from an original sheet, a transfer sheet containing a conventional transfer layer of the carbon black pigment and wax type was employed. Referring to FIG. 2 of the drawing, a thin film base of Mylar 11 was vacuum metallized with a very fine, almost transparent, film of silver 14. Then a conventional wax-carbon black transfer layer 13 was applied to the opposite surface of the Mylar to form the transfer sheet. Next, an original sheet 10 which it was desired to copy, the transfer sheet and a suitable copy sheet 12 were placed together in the order shown by FIG. 2 and subjected to infrared radiation by passing them through a Thermo-Fax machine so that the radiation was focused upon the original sheet. Upon leaving the machine and being separated, the copy sheet was an exact carbon copy of the original sheet.

This procedure was repeated employing a conventional carbon paper transfer sheet along with the handy insert folder exemplified by FIG. 14 of the drawing. In this manner, the reflector sheet was a thin foil of aluminum having a caliper of about 0.5 mil. The original sheet was placed between the gauze and reflector sheets with its image facing the gauze. The carbon paper and copy sheet were placed between the reflector and base sheets, the carbon paper being against the reflector sheet with its transfer layer facing down and against the copy paper. After infrared radiation treatment and separation of the sheets, an exact carbon copy of the original sheet was produced.

Copies were also made in the manners exemplified above employing as the reflector material titanium dioxide pigmented plastic films such as Mylar, polyvinyl fluoride, tetrafluoroethylene or cellulose acetate in which the pigment is dispersed throughout the film during casting rather than being present as a separate layer. According to the first procedure, a white pigmented tetrafluoroethylene plastic served as the foundation 11a for a conventional wax transfer layer 13 containing carbon black pigment to form the transfer sheet, as shown by FIG. 5. Next, an imaged original sheet 10 which it was desired to copy, the transfer sheet and a suitable copy sheet 12 were placed together in the order shown by FIG. 5 and subjected to infrared radiation by passing them through a Thermo-Fax machine so that the radiation was focused upon the original sheet. Upon leaving the machine and being separated, the copy sheet was an exact carbon copy of the original sheet.

Figure 3:
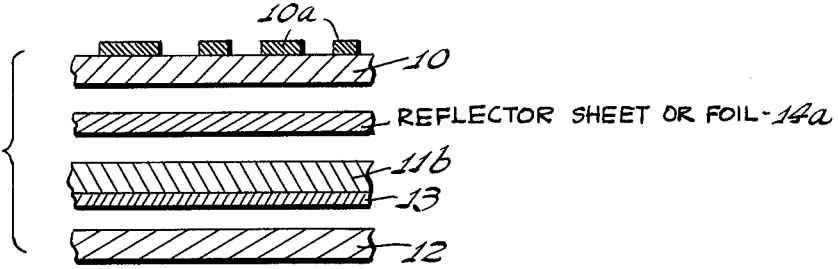

According to the next procedure, copies were made using the white pigmented plastic reflector sheet and a conventional carbon paper as separate units, as shown by FIG. 3. The imaged original sheet which it was desired to copy was placed together with the reflector sheet 14a, the conventional wax based carbon paper 11b and a copy sheet 12 in the order illustrated by FIG. 3. The superposed sheets were subjected to infrared radiation against the original by passing them through a Thermo-Fax machine, and upon separation of the sheets, an exact, clean carbon copy of the original sheet had been formed.

To produce hectograph master sheets by thermographic means, a variety of methods may be used according to the present invention as set forth hereinbefore. One method involves the use of the reflection sheet as the final hectograph master sheet as illustrated by FIG. 12. In this situation the original sheet 10 is placed on top with its images facing the radiation source, the reflection sheet 12b, which may comprise a fine sheet of aluminum foil or a white-pigmented plastic sheet, is placed beneath the original sheet, and a conventional wax base hectograph transfer sheet containing crystal violet and nigrosine dyestuff is placed at the bottom with its transfer layer facing up and against the reflection sheet. After exposure to infrared radiation and separation of the sheets, the metal foil or plastic sheet is reverse-imaged with the hectograph transfer material in areas corresponding to the imaged areas of the original sheet and is suitable for the production of many copies by the spirit duplicating process.

As can be readily understood, the specific examples set forth are merely for illustrative purposes. The critical requirements of the present process reside in the fact that the reflection layer must be positioned between the original sheet and the colored transfer layer, and that the infrared radiation must be directed onto the original sheet which it is desired to copy.

The colorant of the transfer layer may comprise any infrared radiation-absorbing pigment or dyestuff. The present process allows for the use of colorants such as carbon black, graphite, nigrosine, the induline dyes and the aniline black dyes which could not be used up until now in known thermographic processes because of their infrared radiation-absorbing qualities. The use of such colorants is advantageous in that the copies which are produced are themselves reproducible as heretofore stated. The colorants are preferably present in the transfer layer of a conventional carbon paper, hectograph transfer sheet or planographic transfer sheet. Such layers are heat-transferable at temperatures above about 150° F. Heat-resistant transfer layers which contain synthetic polymer binders rather than wax require higher temperatures in excess of about 250° F., such layers being disclosed and claimed in copending application Serial No. 852,612, filed November 13, 1959 now Patent No. 3,054,692, issued September 18, 1962. The so-called fusion-coated transfer sheets may also be employed in the present process with excellent non-smudge results, such sheets being disclosed and claimed in copending application Serial No. 854,342, filed November 20, 1959, now Patent No. 3,031,327 issued April 24, 1962.

As the reflection material, any metallic foil or coating or any metallic- or white-pigmented layer or film has been found suitable as hereinbefore set forth. Foils of aluminum, tin and silver having a thickness of from 0.35 to 2 mils give excellent results. Plastic transparent films such as Mylar, Teflon, Teslar, cellulose acetate, Saran, etc., solvent-coated, spray-coated or vacuum-coated with thin films of aluminum, silver, gold, bronze powder or tin are very satisfactory. Likewise metallic- or white-pigmented wax or resin layers such as ethyl cellulose, nitrocellulose, polyvinyl chloride, polyvinyl acetate, etc. containing large amounts of powdered aluminum, silver, bronze, titanium dioxide, zinc sulfide or zinc oxide give excellent results, as do white-pigmented plastic films such as cellulose acetate, polyethylene, Mylar, Teflon, Teslar, Saran, etc. which have been cast with the metallic powder or white pigments in the casting composition. The amount of pigment should range between 10% and 60% by weight of the total weight of the layer or film. Such reflection materials may be used independently of the transfer sheet, as shown for instance by FIGS. 3, 10, 12 and 14 of the accompanying drawing, or may be incorporated as part of the transfer sheet according to any of the embodiments illustrated by the other figures of the drawing.

The thickness of the metallic layer or the concentration of the white or metallic pigment on the reflection sheet is determined by many factors among which may be included the infrared radiation-absorbing ability of the images of the original sheet, the thickness and transparency of the original sheet, the thickness and transparency of the transfer sheet foundation, the melting point of the transfer layer and its infrared-absorbing ability and the strength of the radiation source. If the images on the original sheet have good infrared-absorbing ability, then they will heat quickly and the exposure to radiation need only be slight. If the original sheet and the foundation of the transfer sheet are thin and have good transparency, then the radiation will be allowed to pass therethrough without being absorbed to any material degree and without generating overall heat. If the transfer layer is based upon wax binder and has a relatively low melting point in the order of about 150° F., then the time of exposure to radiation necessary to generate sufficient heat in the imaged areas is relatively short.

However, the contrary is also true, namely that when the images on the original sheet have poor radiation-absorbing ability, or when the original sheet and the foundation sheet are relatively thick in the order of 3 or 4 mils and radiation-absorbent, or when the transfer layer is high melting in the order of 200° to 250° F., then the time of exposure to infrared radiation must be increased in order to generate sufficient heat in the original images to cause a copy to be formed. As the time of exposure is increased, then the importance of the reflector layer becomes more critical, and the reflecting ability of the reflector layer must be increased to combat the increased amount of infrared radiation which is applied. Thus the thickness of the reflector layer and the concentration of white pigment in the reflector layer are predetermined by the nature of the original sheet and the transfer sheet as set out above.

The source of infrared radiation is not critical, although the use of an infrared radiation lamp is preferred, particularly when incorporated in a convenient apparatus such as the Thermo-Fax machine. The length of exposure time, of course, depends upon the items outlined above as well as the strength and proximity of the radiation source, but in general exposure is continued only long enough to provide for a heat generation in the imaged areas of the original sheet sufficiently high to melt the transfer layer of the transfer sheet in the corresponding areas, generally between about two and twenty seconds. Thus, temperatures within the range of about 150°–650° F. are preferred.

The term "layer" as applied to the reflection material and as used in the present claims is used to connote such material in any of the forms disclosed herein, such as metallic foils, metallic films, metallic- or white-pigmented wax and resinous layers as well as metallic- or white-pigmented plastic films.

Variations and modifications may be made within the scope of the claims and portions of the improvements may be used without others.

We claim:

1. The method for producing infrared radiation-absorbing images on a copy sheet directly from an infrared radiation transmitting original sheet having images thereon containing infrared radiation-absorbing material which comprises superposing said original sheet with a copy sheet and a transfer sheet bearing a heat-transferable infrared radiation-absorbing layer containing a colorant, and positioning a heat-conductive infrared radiation-reflecting layer containing a determinate amount of reflecting material between the original sheet and the transfer layer of the transfer sheet, and directing a sufficient quantity of infrared radiation onto the original sheet which is absorbed by the images thereon and converted to heat which is conducted by said reflecting layer to the heat-transferable layer of the transfer sheet to cause it to transfer to the copy sheet in areas corresponding to the location of the images of the original sheet, the radiation not absorbed by the images on the original being transmitted by the original sheet to the reflecting layer and being reflected and substantially prevented from reaching the transfer layer of the transfer sheet by the reflecting layer so that said transfer layer does not transfer to the copy sheet in areas between said transferred images.

2. The method defined in claim 1, in which the colorant of the transfer layer comprises infrared radiation-absorbent carbon black.

3. The method defined in claim 1, in which the colorant of the transfer layer comprises hectograph dyestuff.

4. The method defined in claim 1, in which the transfer sheet comprises the layer of infrared radiation-reflecting material.

5. The method defined in claim 1, in which the copy sheet comprises the layer of infrared radiation-reflecting material.

6. The method defined in claim 1, in which the layer of infrared radiation-reflecting material is present as a discrete sheet.

7. The method defined in claim 1, in which the layer of infrared radiation-reflecting material is metallic.

8. The method defined in claim 1, in which the layer of infrared radiation-reflecting material comprises bright pigment.

9. A heat-sensitive transfer sheet designed for the production of copies directly from an imaged original sheet under the influence of infrared radiation comprising a foundation sheet having adhered to one surface thereof a heat-conductive layer containing a determinate amount of infrared radiation-reflecting material sufficient to prevent the passage therethrough of infrared radiation and also carrying a heat-transferable infrared radiation-absorbing layer containing a colorant.

10. A heat-sensitive transfer sheet according to claim 9, in which the layer containing the reflecting material is positioned on one surface of the foundation and the heat-transferable layer is positioned on the opposite surface of said foundation.

11. A heat-sensitive transfer sheet according to claim 9, in which the layer containing the reflecting material is positioned on one surface of the foundation and the heat-transferable layer is positioned on the surface of said layer containing the reflecting material.

12. A heat-sensitive transfer sheet comprising a heat-conductive foundation sheet containing a determinate amount of infrared radiation-reflecting material sufficient to prevent the passage of infrared radiation and having thereon a heat-transferable infrared radiation-absorbing layer.

13. A heat-sensitive transfer sheet according to claim 12, in which the foundation sheet consists of a plastic sheet containing a determinate amount of infrared radiation-reflecting white pigment.

14. A heat-sensitive transfer sheet according to claim 12, in which the foundation sheet consists of a metal foil.

15. A unit designed for the production of copies directly from an imaged original sheet under the influence of infrared radiation which comprises a copy sheet and a heat-sensitive transfer sheet removably attached along one edge, said transfer sheet consisting of a foundation sheet having on one surface thereof a heat-conductive layer containing a determinate amount of infrared radiation-reflecting material sufficient to prevent the passage therethrough of infrared radiation, and a top heat-transferable infrared radiation-absorbing layer containing a colorant.

16. A unit designed for the production of copies directly from an imaged original sheet under the influence of infrared radiation which comprises a top sheet of infrared radiation-transmitting material, a middle sheet comprising a determinate amount of infrared radiation-reflecting material and a base sheet, all of which are attached along one edge.

References Cited by the Examiner

UNITED STATES PATENTS

| 2,118,888 | 5/1938 | Lewis et al. | 101—149.4 |
| 2,351,073 | 6/1944 | Sherman | 101—149.4 X |
| 2,671,734 | 3/1954 | Rosenblum | 101—149.4 X |
| 2,769,391 | 11/1956 | Roshkind | 101—149.4 |
| 2,808,777 | 10/1957 | Roshkind | 101—128.2 |
| 2,976,415 | 3/1961 | Kuhrmeyer | 250—65.1 |

FOREIGN PATENTS 844,696    8/1960    Great Britain.

DAVID KLEIN, Primary Examiner.

R. G. NILSON, Examiner.